United States Patent
Makino et al.

(10) Patent No.: US 8,987,950 B2
(45) Date of Patent: Mar. 24, 2015

(54) ACTUATOR AND ACTUATOR COOLING METHOD

(71) Applicant: Kabushiki Kaisha Yaskawa Denki, Kitakyushu-shi, Fukuoka (JP)

(72) Inventors: Shogo Makino, Fukuoka (JP); Takeo Suzuki, Fukuoka (JP); Yukio Tsutsui, Fukuoka (JP); Motomichi Ohto, Fukuoka (JP)

(73) Assignee: Kabushiki Kaisha Yaskawa Denki, Kitakyushu-shi, Fukuoka (JP)

( * ) Notice: Subject to any disclaimer, the term of this patent is extended or adjusted under 35 U.S.C. 154(b) by 226 days.

(21) Appl. No.: 13/654,740

(22) Filed: Oct. 18, 2012

(65) Prior Publication Data

US 2013/0106202 A1    May 2, 2013

(30) Foreign Application Priority Data

Oct. 20, 2011   (JP) .................................. 2011-231157

(51) Int. Cl.
- *H02K 5/18* (2006.01)
- *H02K 9/04* (2006.01)
- *H02K 41/03* (2006.01)

(52) U.S. Cl.
CPC ................ *H02K 9/04* (2013.01); *H02K 41/031* (2013.01)
USPC ...................................................... 310/12.29

(58) Field of Classification Search
None
See application file for complete search history.

(56) References Cited

U.S. PATENT DOCUMENTS

| 5,341,074 A * | 8/1994 | Zorzolo ........................... 318/17 |
| 6,426,573 B1 * | 7/2002 | Hwang et al. .............. 310/12.04 |
| 2007/0063603 A1 * | 3/2007 | Levine et al. .................... 310/85 |
| 2008/0309260 A1 * | 12/2008 | Kanai et al. ...................... 318/38 |
| 2009/0033157 A1 * | 2/2009 | Maemura et al. ................ 310/12 |
| 2009/0243443 A1 * | 10/2009 | Aoki et al. .................. 310/68 D |
| 2010/0181848 A1 * | 7/2010 | Nagasaka .................. 310/12.29 |

FOREIGN PATENT DOCUMENTS

| JP | 2000-217310 A | 8/2000 |
| JP | 2001-105270 | 4/2001 |
| JP | 2007-142359 A | 6/2007 |
| JP | 2011-066980 A | 3/2011 |

OTHER PUBLICATIONS

Japanese Office Action dated Aug. 20, 2013 and English translation thereof.
Chinese Office Action dated Aug. 25, 2014 issued in corresponding Chinese application No. 201210376463.9 and the English translation thereof.
Office Action dated Jun. 27, 2014 and English translation issued in Korean Application No. 10-2012-0111508.

* cited by examiner

*Primary Examiner* — Tran Nguyen
(74) *Attorney, Agent, or Firm* — Bacon & Thomas, PLLC

(57) ABSTRACT

An actuator in accordance with an embodiment includes at least one linear motor, a partition member and a fan. The linear motor is configured to linearly move a shaft serving as a movable member. The partition member is provided close to the shaft and configured to partition a space defined between the shaft and a control board for controlling the linear motor. Further, the fan is arranged on the side of the shaft with respect to the partition member and configured to flow an air existing in a partitioned space on the side of the shaft.

13 Claims, 4 Drawing Sheets

ACTUATOR AND ACTUATOR COOLING METHOD

CROSS-REFERENCE TO RELATED APPLICATIONS

The present disclosure contains subject matter related to that disclosed in Japanese Priority Patent Application No. 2011-231157 filed with the Japan Patent Office on Oct. 20, 2011, the entire contents of which are incorporated herein by reference.

BACKGROUND OF THE INVENTION

1. Field of the Invention

An embodiment disclosed herein relates to an actuator and an actuator cooling method.

2. Description of the Related Art

Conventionally, there is known an actuator provided with a drive device such as a linear motor for linearly moving a movable member. Moreover, an actuator incorporating a plurality of drive devices is under development and is used as, e.g., a component transfer device for moving a plurality of components to a specified place while holding them (see, e.g., Japanese Patent Application Publication No. 2001-105270).

SUMMARY OF THE INVENTION

An actuator in accordance with an aspect of an embodiment includes: one or more drive devices, each being configured to linearly move a movable member; a partition member provided close to the movable member and configured to partition a space defined between the movable member and a control device for controlling the drive devices; and a fan arranged on the side of the movable member with respect to the partition member and configured to flow an air existing in a partitioned space on the side of the movable member with respect to the partition member.

DESCRIPTION OF THE EMBODIMENTS

Hereinafter, embodiments of an actuator and an actuator cooling method disclosed in the subject application will now be described with reference to the accompanying drawings. However, the actuator and the actuator cooling method are not limited to the embodiments to be described below.

(First Embodiment)

Figure 1A:
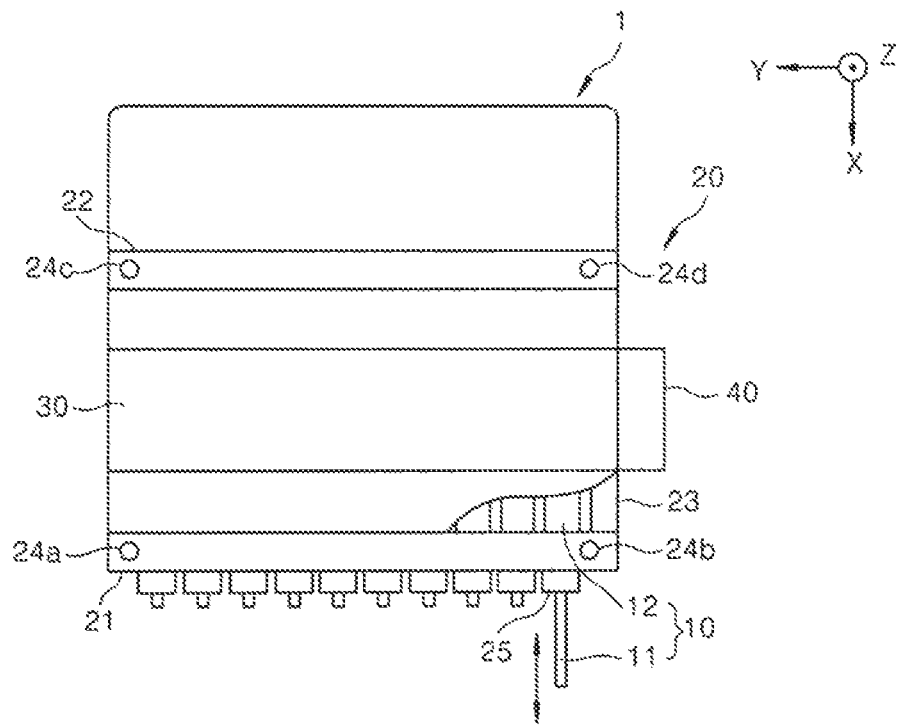
FIG. 1A is a schematic view showing an actuator in accordance with a first embodiment.
Figure 1B:
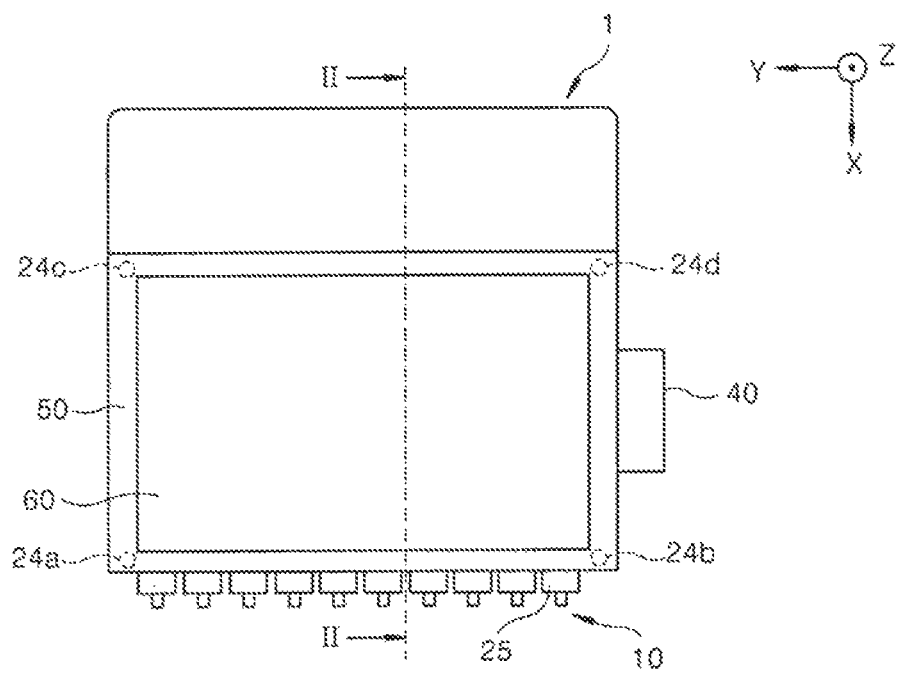
FIG. 1B is a schematic view of the actuator equipped with a control board.

FIG. 1A is a schematic view showing an actuator in accordance with a first embodiment. FIG. 1B is a schematic view of the actuator equipped with a control board. The actuator in the first embodiment is used as, e.g., a head module of a component transfer module for moving a component to a specified place while holding the component.

As shown in FIG. 1A, the actuator 1 in the present embodiment includes a plurality of linear motors 10, a frame 20, a partition member 30 and a fan 40.

Each of the linear motors 10 is a drive device for linearly moving a shaft 11 inserted into a tubular guide member 12 along the guide member 12. The guide member 12 serves also as a magnetic motor frame. As the opposite end portions of the guide member 12 are supported by a first support portion 21 and a second support portion 22 of the frame 20, each of the linear motors 10 is fixed to the frame 20. The shaft 11 of each of the linear motors 10 is linearly movably supported by a third support portion 25 attached to the first support portion 21.

The actuator 1 in the first embodiment is provided with ten linear motors 10. Ten guide members 12 corresponding to the respective linear motors are arranged side by side. The number of the linear motors of the actuator is not limited to ten, and a single linear motor serving the drive device may be provided.

The frame 20 includes the first support portion 21, the second support portion 22, a sidewall portion 23, a plurality of posts 24a to 24d and the third support portion 25.

The first support portion 21 and the second support portion 22 are members for respectively supporting the tip end portions and the base end portions of the guide members 12. The sidewall portion 23 is a member for covering the side surfaces of the guide members 12 and is arranged between the fan 40 and the guide member 12 positioned nearest to the fan 40. In the sidewall portion 23, there is formed a cutout portion for allowing the air blown by the fan 40 to be directly contacted with the guide members 12. Detail description thereof will be made later.

The posts 24a so 24d are members for supporting the control board of the linear motors 10 to be described later. The posts 24a and 24b are arranged in, e.g., the first support portion 21. The posts 24c and 24d are arranged in, e.g., the second support portion 22.

FIG. 1B is a schematic view of the actuator 1 equipped with the control board of the linear motors 10. As shown in FIG. 1B, a board plate 50 is mounted on the upper end portions of the posts 24a to 24d. A control board 60 of the linear motors 10 is mounted on the board plate 50. The control board 60 is a control device for controlling the linear motors 10.

Referring back to FIG. 1A, description will be made on the partition member 30. The partition member 30 is a member for partitioning the space between the board plate 50 and the guide members 12. The fan 40 is arranged on the side of the guide members 12 with respect to the partition member 30 and is configured to flow the air existing in a partitioned space on the side of the guide members 12.

In the actuator 1 of the first embodiment, the space between the board plate 50 and the guide members 12 is partitioned by the partition member 30. The air existing in the partitioned space on the side of the guide members 12 with respect to the partition member 30 is blown by the fan 40, thereby suppressing a temperature increase around the linear motors 10 and the shaft 11. Description will now be made on the arrangement and configuration of the partition member 30 and the fan 40.

In the following description, as shown in FIG. 1A, the moving direction of the shaft 11 will be referred to as X-axis direction, the arranging direction of the guide members 12 will be referred to as Y-axis direction and the direction orthogonal to the X-axis and the Y-axis will be referred to as Z-axis direction. Moreover, the positive and negative directions of the Z-axis will be referred to as upper and lower sides of the actuator 1, respectively.

In the first embodiment, the fan 40 is described as being an air blower for blowing the external air toward the partitioned space on the side of the guide members 12. Alternatively, the fan 40 may be an evacuator for drawing the internal air existing in the partitioned space on the side of the guide members 12.

Figure 2:
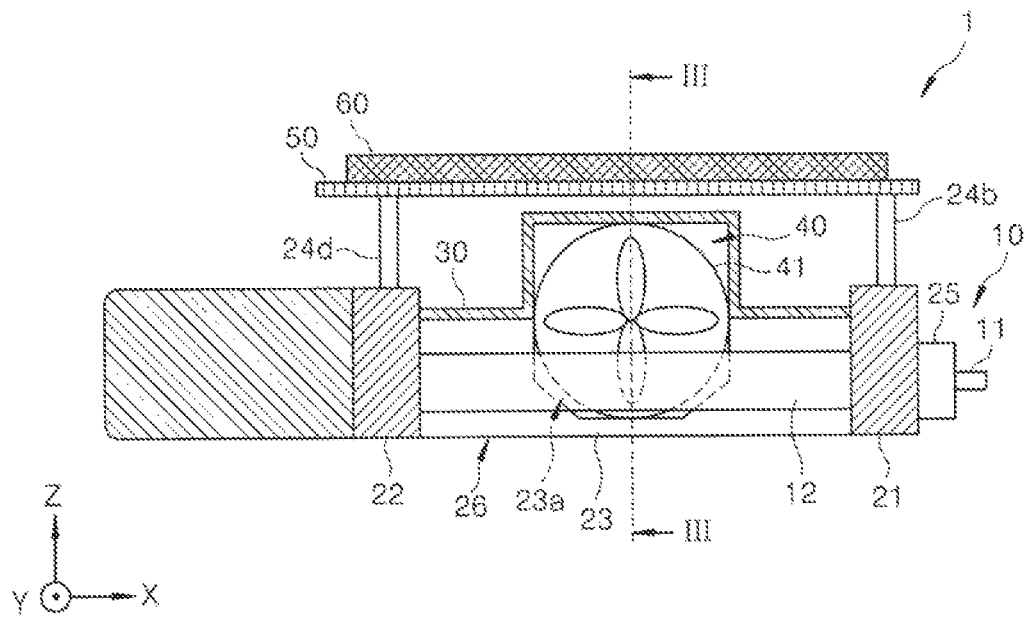
FIG. 2 is a section view taken along line II-II in FIG. 1B.

FIG. 2 is a section view taken along line II-II in FIG. 1B. As shown in FIG. 2, the board plate 50 and the control board 60 are arranged around the shaft 11. More specifically, the board plate 50 and the control board 60 are supported by the posts 24a to 24d (see FIG. 1B) and are arranged above the guide members 12 with a specified gap left therebetween.

The partition member 30 is arranged between the board plate 50 and the guide members 12. More specifically, the partition member 30 is arranged to close the open portion of the frame 20 formed above the guide members 12. The partition member 30 is made of a material having relatively high heat conductivity, e.g., aluminum, copper or iron.

In this manner, the actuator 1 can be configured such that the heat transfer from the control board 60 to the shaft 11 becomes difficult by partitioning the space between the control board 60 and the shaft 11, i.e., the space between the board plate 50 and the guide members 12, with the partition member 30.

The partition member 30 can also shield the electric wave noise generated by the control board 60 and the electromagnetic noise generated by the linear motors 10. By providing the partition member 30, the actuator 1 can be configured such that it becomes difficult for the electric wave noise generated by the control board 60 to be transferred to the Linear motors 10 and also it becomes difficult for the electromagnetic noise generated by the linear motors 10 to be transferred to the control board 60.

The partition member 30 may be formed by a material having high heat conductivity, such as aluminum, the surface of which is coated with iron powder. This makes it possible to further enhance the effect of shielding the electric wave noise and the electromagnetic noise. This holds true in case where the partition member 30 is formed by an iron plate effective in shielding the electric wave noise and the electromagnetic noise, the surface or which is coated with a material having a high heat conductivity. The partition member 30 may be formed into an arc shape in conformity with the external shape of the fan 40.

The fan 10 is arranged on the side of the guide members 12 with respect to the partition member 30. The fan 40 is provided to blow, when driven, the external air toward the storage space of the guide members 12 defined by the frame 20 together with the partition member 30 and the fan 40.

The frame 20 has an opening 26 formed at the opposite side of the guide members 12 from the partition member 30. By driving the fan 40, the air existing in the storage space is blown to the outside through the opening 26 of the frame 20. In this manner, the actuator 1 is configured to replace the air existing in the storage space of the guide members 12 with a new air by using the fan 40, thereby making it possible to suppress a temperature increase in the storage space of the guide members 12. In addition, the partition member 30 itself can be cooled by the air blown by the fan 40.

Figure 3:
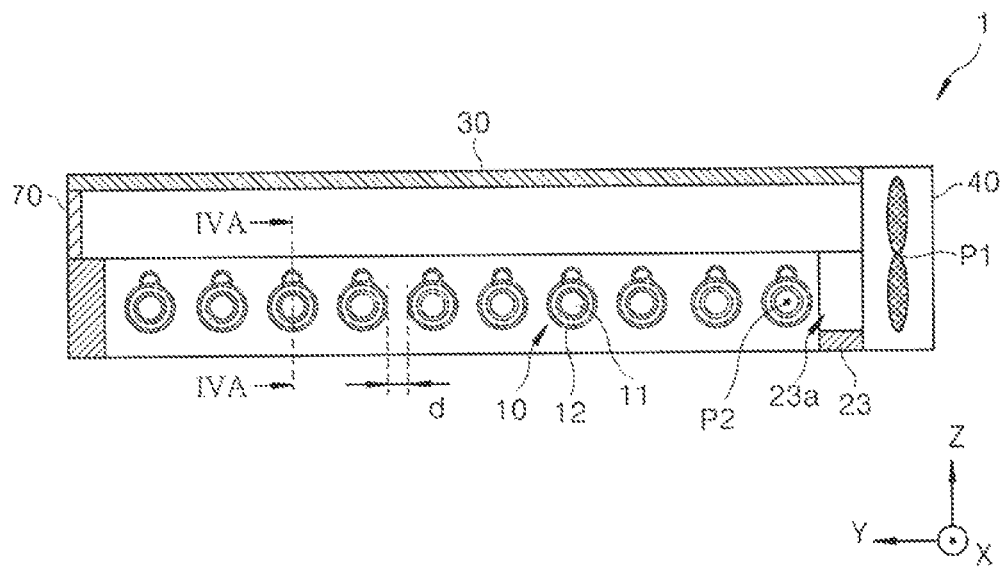
FIG. 3 is a section view taken along line III-III in FIG. 2.

Hereinafter, more detail description will be made with reference to FIG. 3. FIG. 3 is a section view taken along line III-III in FIG. 2. For the sake of easier understanding, the posts 24c and 24d, the board plate 50 and the control board 60 are omitted in FIG. 3.

As shown in FIG. 3, an axis P1 of the fan 40 extends substantially parallel to the arranging direction of the guide members 12, i.e., the Y-axis direction. Further, the axis P1 of the fan 40 is arranged closer to the partition member 30 than the axes P2 of the guide members 12.

Accordingly, upon operating the fan 40, an atmospheric pressure difference is generated between a space on the side of the partition member 30 with respect to the guide members 12 and a space on the side of the opening 26 with respect to the guide members 12. More specifically, the atmospheric pressure in the space on the side of the partition member 30 with respect to the guide members 12 is higher than the atmospheric pressure in the space on the side of the opening 26 with respect to the guide members 12.

Thus, the air existing in the storage space of the guide members 12 flows from the high atmospheric pressure side toward the low atmospheric pressure side. That is, the air flows from the space on the side of the partition member 30 with respect to the guide members 12 toward the opening 26. Therefore, the actuator 1 of the first embodiment can efficiently blow the air existing in the storage space of the guide members 12 to the outside through the opening 26.

Further, the guide members 12 are arranged side by side with a specified gap "d" left therebetween. Thus, the air existing in the storage space of the guide members 12 flows toward the opening 26 through the gaps "d" between the guide members With the actuator 1 configured as described above, it is therefore possible to increase the cooling effect of the linear motors 10 as compared with a case where the guide members 12 are arranged in a mutually-contacting state.

As shown in FIGS. 2 and 3, a cutout portion 23a conforming to the shape of a blowing hole 41 of the fan 40 is formed in the sidewall portion 23 of the frame 20 provided between the guide members 12 and the fan 40. As a result, the air blown by the fan 40 is brought into direct contact with the guide members 12. This makes it possible to increase the cooling effect of the guide members 12. The cutout portion 23a may not be formed.

In this manner, the actuator 1 of the first embodiment can be configured to suppress a temperature increase around the shaft 11 by blowing the air existing in the storage space of the guide members 12 by using the fan 40.

Further, in the first embodiment, one opening 26 is formed in the storage space of the guide members 12. However, in addition to the opening 26, another opening may be formed in the storage space of the guide members 12.

For example, as shown in FIG. 3, the opposite side of the storage space of the guide members 12 from the fan 40 is kept closed by a cover body 70 in the actuator 1. Alternatively, the actuator 1 may not be provided with the cover body 70. That is to say, the opposite side of the storage space of the guide members 12 from the fan 40 may be opened just like the opening 26.

Figure 4A:
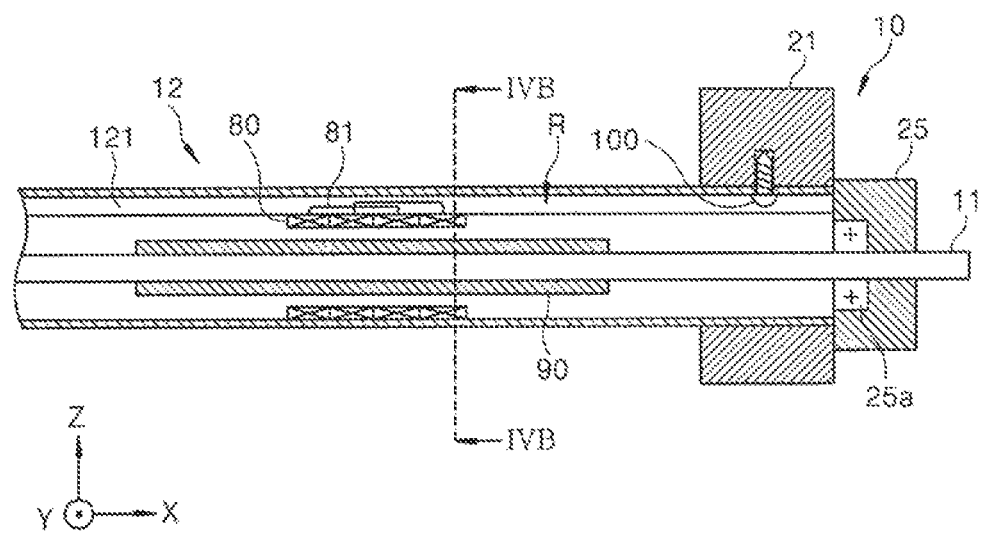
FIG. 4A is a section view taken along line IVA-IVA in FIG. 3.
Figure 4B:
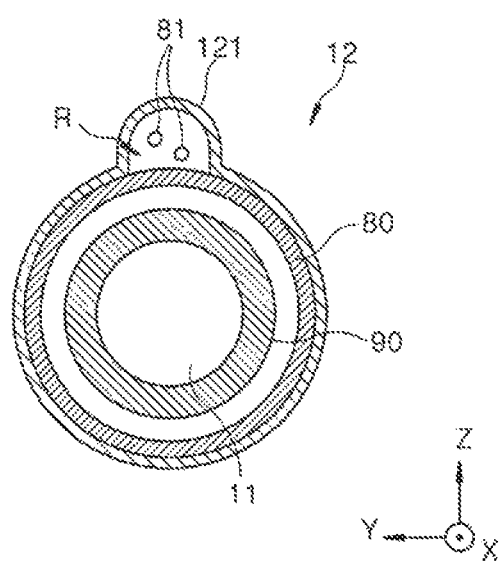
FIG. 4B is a section view taken along line IVB-IVB in FIG. 4A.

Next, the configuration of each of the linear motors 10 will be described with reference to FIGS. 4A and 4B. FIG. 4A is a section view taken along line IVA-IVA in FIG. 3. FIG. 4B is a section view taken along line IVB-IVB in FIG. 4A.

As shown in FIG. 4A, each of the linear motors 10 includes the shaft 11 and the guide member 12. The shaft 11 is a cylindrical columnar member and has a permanent magnet 90 arranged on the circumferential surface thereof. The permanent magnet 90 is arranged in an opposing relationship with a coil 80 to be described later (see FIG. 4B).

The shaft 11 is linearly movably supported by a linear movement bearing 25a such as a linear bearing arranged in the third support portion 25. The shaft 11 is an example of a movable member.

The guide member 12 is a tubular member. The coil 80 having a tubular shape is fixed to the inner circumferential surface of the guide member 12 by molding or bonding. The guide member 12 serves as a magnetic path of magnetic flux generated from the permanent magnet 90. For that reason, the guide member 12 is made of a magnetic material such as iron or the like. The guide member 12 is an example of a stator.

The guide member 12 is formed into a tubular shape as mentioned above. Therefore, the air resistance of the guide member 12 is smaller than the air resistance of, e.g., guide member having a prismatic shape. Accordingly, the guide member 12 is more easily cooled by the air blown from the fan 40 compared with the guide member having a prismatic shape. By providing the guide member 12 having a tubular shape, the actuator 1 can enable the air blown from the fan 40 to reach the inner side of the storage space of the guide member 12 with ease.

As shown in. FIG. 4B, the guide member 12 has a protruding portion 121 protruding in the positive direction of the Z-axis, i.e., toward the partition member 30. By forming such protruding portion 121, a specified space R is formed between the inner circumferential surface of the guide member 12 and the coil 80. The specified space R is a space that accommodates, e.g., a bolt screw 100 for fixing the guide member 12 to the first support portion 21. The specified space R serves also as a space for accommodating a jumper wire 81 of the coil 80.

The surface area of the guide member 12 is increased by forming the protruding portion 121. Thus, it becomes easy to dissipate heat as compared with a case where the guide member 12 is not provided with the protruding portion 121. In this manner, since the guide member 12 has the protruding portion 121 serving as a fin, the cooling effect thereof can be increased. Further, since the coil 80 makes close contact with the guide member 12, the heat of the coil 80 is readily dissipated from the guide member 12.

As described above, the actuator 1 in accordance with the first embodiment includes the linear motors, the partition member and the fan. Each of the linear motors linearly moves the shaft. The partition member is arranged close to the shaft to partition the space defined between the control board for controlling the linear motors and the shaft. The fan is arranged on the side of the shaft with respect to the partition member and is configured to flow the air existing in the partitioned space on the side of the shaft. With the actuator of the first embodiment, it is possible to suppress a temperature increase around the shaft.

(Second Embodiment)

In the first embodiment described above, the guide members 12 are arranged at a regular interval "d" (see FIG. 3). However, the guide members 12 may be arranged at different intervals.

A case where the intervals between the guide members are varied depending on the distance from the fan 40 will now be described with reference to FIG. 5. In the following description, like reference numerals will be given to the same parts as those described in the above and redundant description thereof will be omitted.

Figure 5:
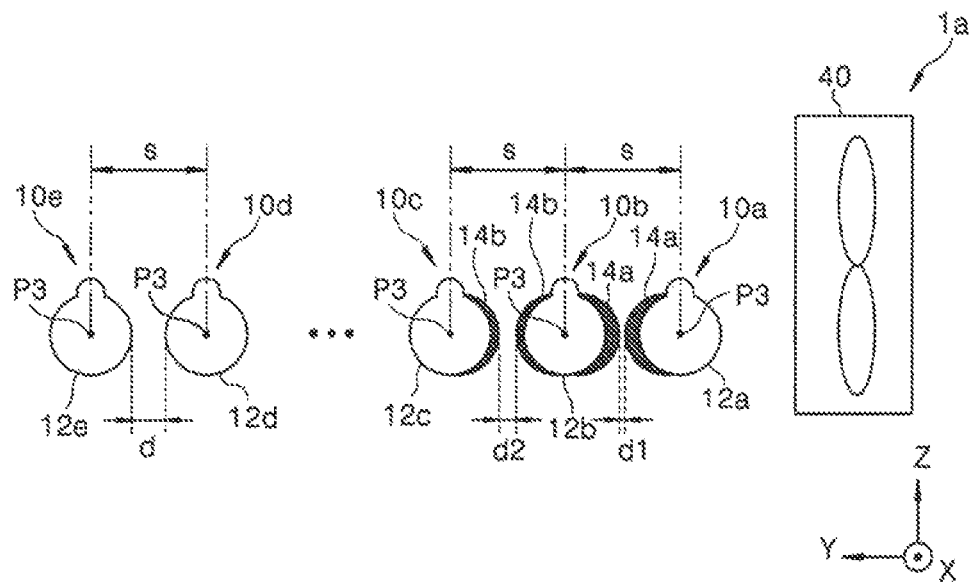
FIG. 5 is an explanatory view illustrating a case where the intervals between guide members are varied depending on the distance from a fan.

FIG. 5 is an explanatory view illustrating the case where the intervals between guide members are varied depending on the distance from the fan. In FIG. 5, among the linear motors included in the actuator 1a, three linear motors arranged closest to the fan 40 are designated by reference numerals 10a, 10b and 10c in the order of distance from the fan 40. Further, among the linear motors included in the actuator 1a, two linear motors arranged farthest from the fan 40 are designated by reference numerals 10d and 10e in the order of distance from the fan 40.

As shown in FIG. 5, the linear motors 10a to 10e are respectively provided with guide members 12a to 12e. In the second embodiment, the actuator 1a is configured such that the intervals between the guide members 12a to 12e are adjusted to be gradually increased as the distance from the fan 40 is increased.

More specifically, the actuator 1a includes interval adjustment members 14a and 14b for adjusting the intervals between the guide members 12a to 12e. The interval adjustment members 14a and 14b may be made of, e.g., a resin.

For example, the interval adjustment members 14a are members for narrowing the interval between the guide members 12a and 12b. The interval adjustment members 14a are respectively arranged on a surface of the guide member 12a opposite to the guide member 12b and a surface of the guide member 12b opposite to the guide member 12a. Therefore, the interval between the guide members 12a and 12b, i.e., the interval between the interval adjustment members 14a, becomes equal to "d1" which is smaller than the interval "d" (see FIG. 3) between the guide members 12a and 12b available when the interval adjustment members 14a are not provided.

The interval adjustment members 14b are members for narrowing the interval, between the guide members 12b and 12c. The adjustor members 14b are respectively arranged on a surface of the guide member 12b opposite to the guide member 12c and a surface of the guide member 12c opposite to the guide member 12b. Therefore, the interval between the guide members 12b and 12c, i.e., the interval between the interval adjustment members 14b, becomes equal to "d2" which is smaller than the interval "d" (see FIG. 3) between the guide members 12b and 12c available when the interval adjustment members 14b are not provided. The interval "d2" is larger than the interval "d1" between the guide members 12a and 12b.

No interval adjustment member is provided between the two guide members 12d and 12e arranged farthest from the fan 40. Accordingly, the interval "d" between the guide members 12d and 12e is larger than the interval "d2" between the guide members 12b and 12c.

In the second embodiment, as described above, the actuator 1a can be configured such that the intervals between the guide members 12a and 12b, and between the guide members 12b and 12c are adjusted to be increased as the distance from the fan 40 is increased. As a result, a flow rate of the air is reduced when passing through the gaps between the guide members positioned closer to the fan 40. On the other hand, the flow rate of the air is increased when passing through the gaps between the guide members positioned farther from the fan 40.

Since the fan. 40 is arranged at one end of the arranging direction of the guide members 12a to 12e, there may possibly be generated a deviation in the effect of cooling the guide members 12a to 12e with the fan 40. For example, in case of the actuator 1a shown in FIG. 5, the air blown from the fan 40 is easy to make contact with the guide member 12a positioned closest to the fan 40. The air blown from the fan 40 is hard to make contact with the guide member 12e positioned farthest from the fan 40. Therefore, it is likely that the guide member 12e is hard no be cooled compared to the guide member 12a.

In the second embodiment, the intervals between the guide members 12a to 12e are adjusted to be increased as the distance from the fan 40 is increased, thereby increasing the flow rate of the air passing through the gaps between the guide members positioned farther from the fan 40. This makes it possible to reduce a deviation in the cooling effect, which may be generated between the guide members 12a to 12e.

Referring again to FIG. 5, the respective guide members 12a to 12e are arranged such that intervals S between the axes P3 remain constant. Therefore, in the second embodiment, the intervals between the guide members 12a to 12e are differently set while the intervals between the axes P3 of the guide members 12a to 12e, i.e., the intervals between the shafts are maintained constant. Therefore, the actuator 1a of the second embodiment does not suffer from the impairment of controllability as compared with a typical actuator in which a plurality of guide members is arranged at a regular interval.

While the foregoing description is directed to the case where the intervals between the guide members 12a. to 12e are adjusted to be gradually increased as the distance from the fan 40 is increased, the intervals between the guide members 12a to 12e may be adjusted in a stepwise manner. For example, in FIG. 5, there is shown the case where the intervals between the guide members 12a to 12e are gradually increased in the order of d1, d2, ..., d from the fan 40, but the interval between the guide members 12a to 12e may be increased stepwise in the order of, e.g., d1, d1, d2, d2, and so forth.

In the second embodiment, as described above, the intervals between the guide members are set such that the interval (e.g., the interval "d") between the neighboring guide members (e.g., the guide members 12d and 12e) arranged farther from the fan becomes larger than the interval (e.g., the interval "d1") between the neighboring guide members (e.g., the guide members 12a and 12b) arranged closer to the fan. With such configuration, it is therefore possible to reduce a deviation in the cooling effect generated between the guide members and to equally cool the guide members.

(Third Embodiment)

Figure 6:
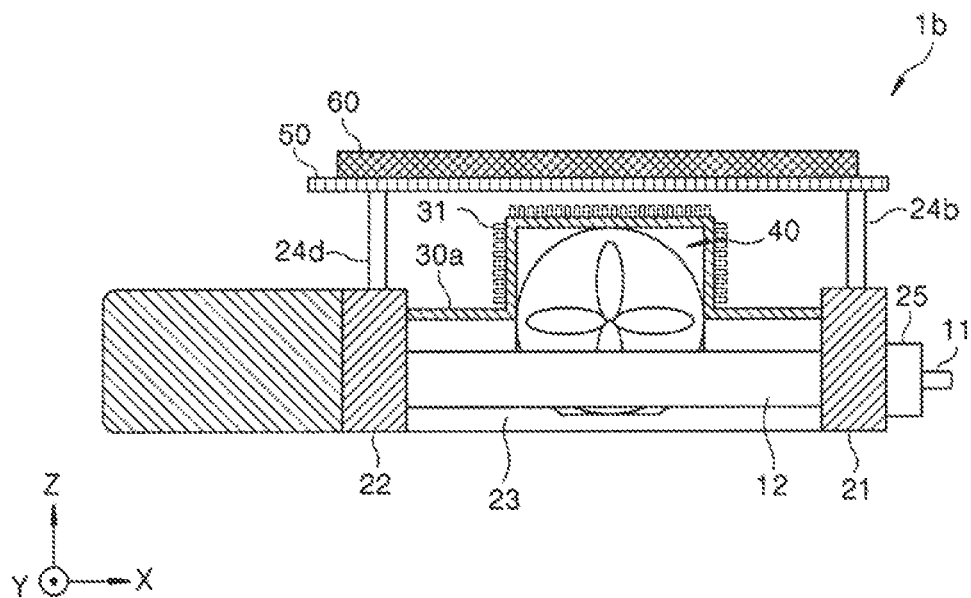
FIG. 6 is an explanatory view illustrating a case where fins are provided in a partition member.

While the first embodiment described above is directed to the case where the heat generated from the control board 60 is shielded by the partition member 30, heat dissipating portions may be provided on the partition member in order to increase the heat dissipating effect of the partition member. A case where fins are provided on the partition member will now be described by way of example with reference to FIG. 6. FIG. 6 is an explanatory view illustrating the case where fins are provided on the partition member.

As shown In FIG. 6, the actuator 1b of the third embodiment includes a partition member 30a in place of the partition member 30 of the actuator 1 of the first embodiment. The partition member 30a. includes fins 31 arranged on a surface thereof facing the board plate 50. By providing the fins 31, it becomes easy to dissipate heat accumulated in the partition member 30a. This makes it difficult for the heat to be transferred to the space on the side of the guide members 12 with respect to the partition member 30a. Accordingly, it is possible to further suppress a temperature increase around the shaft 11.

While the fins 31 are provided on the surface of the partition member 30a facing the board plate 50 in the present embodiment, it may be possible to arrange the fins on the surface of the partition member facing the guide members. Further, while the partition member 30a is provided with the fins 31 as an example of the heat dissipating member in the present embodiment, the partition member may be provided with other heat dissipating members such as a heat pipe and the like.

In the third embodiment, as described above, the partition member is provided with the heat dissipating portions for dissipating heat. It is therefore possible to further suppress a temperature increase around the shaft.

In the above-described embodiments, the actuator having a plurality of linear motors arranged in a single row has been described as an example of the actuator. However, the actuator may be provided with linear motors arranged in multiple rows.

Further, in the above-described embodiments, the drive device formed of the linear motor has been described. However, the drive device is not limited to the linear motor. As an alternative example, the actuator may be configured to include, as the drive device, the combination of a rotary motor and a ball screw. The ball screw is a linear movement mechanism for linearly moving the shaft. In this case, a nut threadedly coupled to the ball screw and connected to the shaft corresponds to a movable member. A guide rail for linearly moving the nut corresponds to a guide member.

Further, while the heat dissipating portions are provided in the partition member in the third embodiment described above, the actuator may further include, e.g., heat dissipating portions arranged on the lower surface of the board plate.

Other effects and modified examples can be readily derived by those skilled in the art. For that reason, the broad aspect of the actuator and the actuator cooling method are not limited to the specific disclosure and the representative embodiments shown and described above. Accordingly, the actuator and the actuator cooling method can be modified in many different forms without departing from the spirit and scope of general inventive concept defined by the appended claims and the equivalents thereof.

What is claimed is:

1. An actuator comprising:
   one or more drive devices, each being configured to linearly move a movable member, wherein each of the drive device includes a guide member extending along a moving direction of the movable member, the movable member being inserted into the guide member;
   a partition member provided next to the movable member and configured to partition a space defined between the movable member and a control device for controlling the drive devices; and
   a fan arranged on the side of the movable member with respect to the partition member and configured to flow an air existing in a partitioned space on the side of the movable member with respect to the partition member, and
   a frame defining a space enclosing the guide member together with the fan and the partition member, the frame being provided with an opening formed at the opposite side of the guide member from the partition member.

2. The actuator of claim 1,
   wherein guide members of the drive devices are arranged side by side, and
   wherein the fan has an axis substantially parallel to an arranging direction of the guide members, and the axis of the fan is arranged closer to the partition member than the axes of the guide members.

3. The actuator of claim 2, wherein the guide members are arranged at a regular interval.

4. The actuator of claim 2, wherein the guide members are arranged such that an interval between the neighboring guide members distanced farther from the fan is larger than an interval between the neighboring guide members distanced closer to the fan.

5. The actuator of claim 2, wherein each of the guide members is a tubular member having an inner circumferential surface, and wherein a tubular coil is arranged on the inner circumferential surface, the movable member being provided with a permanent magnet opposite to the coil.

6. The actuator of claim 3, wherein each of the guide members is a tubular member having an inner circumferential surface, and wherein a tubular coil is arranged on the inner circumferential surface, the movable member being provided with a permanent magnet opposite to the coil.

7. The actuator of claim 4, wherein each of the guide members is a tubular member having an inner circumferential surface, and wherein a tubular coil is arranged on the inner circumferential surface, the movable member being provided with a permanent magnet opposite to the coil.

8. An actuator comprising:

one or more drive devices, each being configured to linearly move a movable member;

a partition member provided next to the movable member and configured to partition a space defined between the movable member and a control device for controlling the drive devices; and a fan arranged on the side of the movable member with respect to the partition member and configured to flow an air existing in a partitioned space on the side of the movable member with respect to the partition member, wherein each of the drive devices includes a guide member extending along a moving direction of the movable member, the movable member being inserted into the guide member, wherein guide members of the drive devices are arranged side by side, wherein the fan has an axis substantially parallel to an arranging direction of the guide members, and the axis of the fan is arranged closer to the partition member than the axes of the guide members, wherein each of the guide members is a tubular member having an inner circumferential surface, wherein a tubular coil is arranged on the inner circumferential surface, the movable member being provided with a permanent magnet opposite to the coil, and wherein each of the guide members includes a protruding portion for defining a space between the coil and the inner circumferential surface, the protruding portion protruding toward the partition member.

9. The actuator of claim 1, wherein the partition member includes a heat dissipating portion for dissipating heat.

10. The actuator of claim 2, wherein the partition member includes a heat dissipating portion for dissipating heat.

11. The actuator of claim 3, wherein the partition member includes a heat dissipating portion for dissipating heat.

12. The actuator of claim 4, wherein the partition member includes a heat dissipating portion for dissipating heat.

13. An actuator cooling method, comprising:

partitioning a space between a control device and a linearly movable member with a partition member, the control device being configured to control a drive device including the movable member and a guide member extending along a moving direction of the movable member, the movable member being inserted into the guide member;

defining a space enclosing the guide member with the partition member, a fan arranged on the side of the movable member with respect to the partition member, and a frame provided with an opening formed at the opposite side of the guide member from the partition member; and flowing an air existing in the space enclosing the guide member by using the fan.

* * * * *